Feb. 4, 1969   F. J. FORTSCH ET AL   3,425,159

SNAP-IN REINFORCEMENT

Filed Aug. 12, 1966

INVENTORS
FRANCIS J. FORTSCH,
& EDWARD L. DURCH
BY WATTS & FISHER
B A Watts.

ATTORNEYS

# United States Patent Office 3,425,159
Patented Feb. 4, 1969

3,425,159
SNAP-IN REINFORCEMENT
Francis J. Fortsch and Edward L. Durch, Warren, Ohio, assignors to The American Welding & Manufacturing Company
Filed Aug. 12, 1966, Ser. No. 572,014
U.S. Cl. 49—504
Int. Cl. E06b 1/18
7 Claims

ABSTRACT OF THE DISCLOSURE

The disclosed reinforcement is disposed within a sheet metal door frame and engages and supports face, rabbet, stop and soffet parts of the frame. It is retained in the frame by wedging engagement of thin metal tabs on one edge of the reinforcement with the frame.

Background

Field of the Invention.—This invention relates generally to the art of sheet metal frames for use in building construction and is particularly concerned with a new reinforcement for use in hollow metal frames for doors, windows, and the like.

Description of the prior art.—Heretofore, sheet metal frames, particularly door frames, have been provided with reinforcements for door operators and the like which were disposed within the frame and secured in place as by welding. Such reinforcements were usually secured in the frame by welding when the frame was being made. Such welding was expensive because an experienced welder was required to do the work, and was much more expensive if done after the frame was shipped from the place of manufacture. Any reinforcement which was not properly located for subsequent attachment to a door closing device or other operating device could not be relocated at the place of erection without great expense.

Summary

The present invention aims to provide a reinforcement for hollow sheet metal frames which can be installed in the proper location after the frame has been shipped to a storage warehouse or to the place of erection and which does not require any skilled labor to install it.

Briefly stated, this invention includes a reinforcement which can be placed in position inside a hollow frame member and then fixed in position by metal tabs which wedgingly secure the reinforcement in the frame.

Brief description of the drawings

The present invention will be better understood by those skilled in the art from the following specification and the drawings which accompany it, in which:

FIGS. 1 to 4 show a sheet metal frame A and the reinforcement B therefor.

Figure 1:
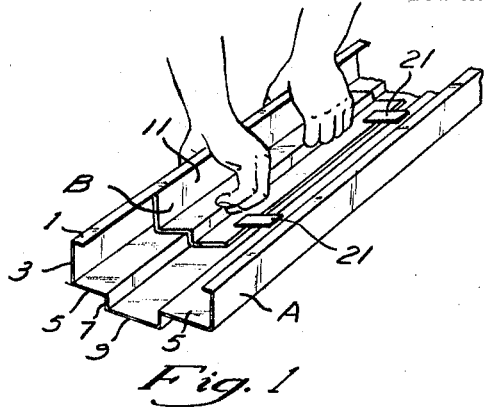
FIG. 1 is a perspective view of a hollow frame member and reinforcement showing the first step in assembling the reinforcement in a door frame.
Figure 2:
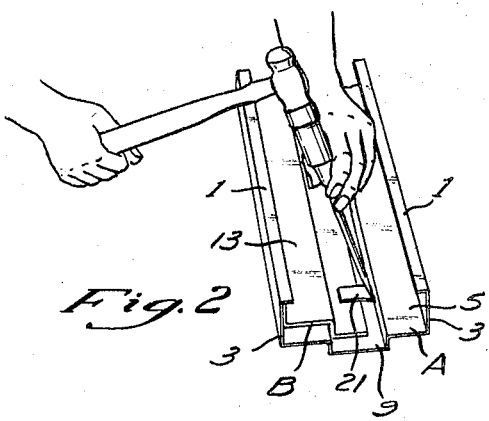
FIG. 2 is similar to FIG. 1 but shows the second step in assembling the reinforcement in the frame.

The frame A is generally rectangular in cross section and hollow and includes return portions 1, face portions 3, and rabbet portions 5. A strike plate portion, generally rectangular in cross section, projects from rabbet portions 5 of the frame and includes stop portions 7 and soffet portion 9. The frame just described is composed of thin gauge sheet metal bent to form said portions.

One form of reinforcement embodying the present invention, designated by character B, is composed of metal of considerably heavier gauge than that of the frame. This reinforcement is bent and thereby shaped to have a face portion 11, a rabbet portion 13, a stop portion 15, and a soffet portion 17. These portions are sized to fit within the frame 3 with the outer surfaces of portions 11, 13, 15 and 17 engaging the inner surfaces or portions 3, 5, 7 and 9 of the frame with portion 11 of the reinforcement fitting closely between return portion 1 and rabbet portion 5 of the frame. The free edge of the soffet portion 17 of the reinforcement is spaced apart from the opposed stop portion 7 of the frame and thin metal tabs 21, shown as being two in number, are welded or otherwise permanently secured to the reinforcement and project laterally from said edge to bear against the rabbet portion 5 of the frame. In other words, portion 17 of the reinforcement is shorter laterally than soffet 9 of the frame, and the tabs 21 bridge the gap between the edge of the soffet 17 and the opposed inner surface of stop 9 of the frame.

Figure 3:
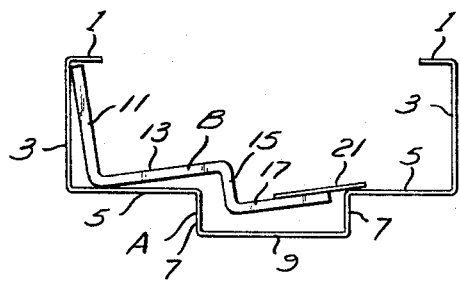
FIGS. 3 and 4 are end views of FIGS. 1 and 2 and show, respectively, the first step in assembling the reinforcement in a frame and the assembled position of those parts.
Figure 4:
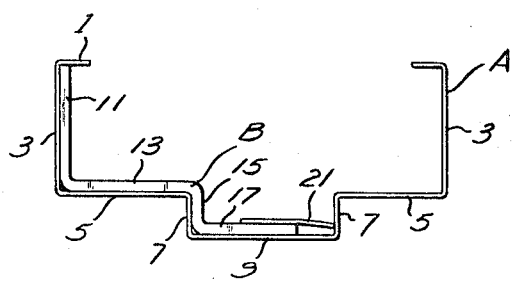

Reinforcement B may be assembled in frame A as is indicated in FIGS. 3 and 4. The first step in making this assembly is to place the reinforcement B in the frame A in about the position shown in FIG. 3 and then to force the soffet portion of the reinforcement down into the space between portions 7 and 9 of the frame. This forcing-down action results in the face portion 11 of the reinforcement being brought into contact with the inner surfaces of the adjacent return portion 1, face portion 3 and rabbet portion 5 of the frame, and the stop and soffet portions of the reinforcement being brought into wedging contact with the inner surface of one stop portion 7 and the soffet portion 9 of the reinforcement. As this movement of the reinforcement is taking place, the tabs 21 are snapped into wedging engagement of their ends with the opposed surface of stop portion 7. Any suitable means may be employed for snapping the tabs into place, for example, a screwdriver or a hammer handle may be used for forcing the tabs down into the wedging position.

Figure 5:
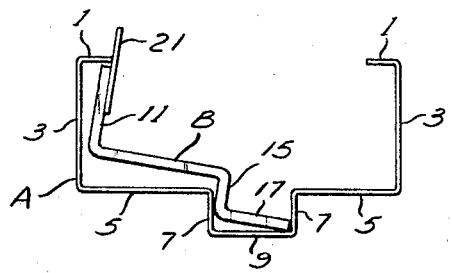
FIGS. 5 and 6 are end views of a modified form of the reinforcement of FIGS. 1 and 2 and show, respectively, the first step of assembling the reinforcement in a frame, the assembled position of those parts.
Figure 6:
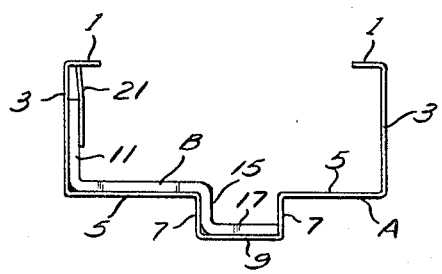

FIGS. 5 and 6 show a modified form of reinforcement embodying the present invention. In this form, the soffet portion 17 of the reinforcement is made long enough to fit tightly between the stop portion 7 of the frame, the rabbet portion 8 is as long as the rabbet portion 5 of the frame, and the face portion 11 of the reinforcement is shorter than the opposed face portion 3 of the frame. The tabs 21 are attached at the free edge of the face portion 3 of the reinforcement and wedgingly engage the inner surface of one return portion 1 of the frame. When the reinforcement is assembled in the frame and the tabs have been snapped into holding position, the soffet portion 17 of the reinforcement will contact the inner surfaces of the stop and soffet portions 7 and 9 of the frame.

It will be understood that the drawings show specifically a reinforcement for use in the attaching of a door opener, closer or other operating device to the door frame header A, but the reinforcement may be used for other purposes and not only in the header member but also in other parts of the door frame and in various desired positions in frames for windows and the like.

It will be seen that the reinforcement above described is inexpensive to manufacture and to assemble in fixed position in a frame member, that highly skilled labor is not required to assemble the reinforcement and frame and that no welding is required. As a result, the reinforcement may be assembled in a frame even after the frame has been delivered to the place of erection at which time the reinforcement may be located precisely when it is required and by the workmen who are erecting the frame.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A hollow, light-gauge, sheet metal frame member including opposed return, facing and rabbet portions and a rectangular hollow door stop projecting from said rabbet portions and including opposed stop portions and a soffet portion therebetween, a heavier gauge metal reinforcement within said member and including face, rabbet, stop and soffet portions sized to have surface engagement with inner surfaces of one set of face, rabbet, stop and soffet portions of the said member, respectively, and thinner metal tabs attached to an edge portion of the reinforcement and projecting therefrom and having wedging engagement with an inner surface of said member to press a portion of the reinforcement against an opposed surface of the member and to retain the reinforcement in assembled position.

2. The combination of elements set forth in claim 1 in which the said member is a door frame and the reinforcement is for use with a door closing or other operating device.

3. The combination of elements set forth in claim 1 in which the tabs have edge engagement with inner surfaces of a return portion of the frame and the reinforcement is pressed into contact with the inner surfaces of the adjacent rabbet, soffet and stop portions of the frame.

4. The combination of elements set forth in claim 1 in which the tabs have edge engagement with the inner surface of one of the stop portions of the frame and the reinforcement is pressed against the inner surfaces of the adjacent return, face and rabbet portions of the frame.

5. A metal reinforcement having face, rabbet, stop and soffet portions to make engagement with inner surfaces of corresponding portions of a hollow sheet metal frame member, and short metal tabs of lighter gauge metal than the reinforcement secured to and projecting from one edge portion of the latter to have wedging engagement with an inner surface of said member and to press a portion of the reinforcement into contact with inner surfaces of the frame.

6. The reinforcement as set forth in claim 5 in which the tabs project beyond the free edge of its soffet portion.

7. The reinforcement as set forth in claim 5 in which the tabs project beyond the free edge of its face portion.

References Cited

UNITED STATES PATENTS

| | | | |
|---|---|---|---|
| 2,043,174 | 6/1936 | Jacobson | 49—399 XR |
| 2,910,155 | 10/1959 | Bradner. | |
| 3,016,994 | 1/1962 | Elder. | |
| 3,103,263 | 9/1963 | Leeser | 52—715 XR |

KENNETH DOWNEY, *Primary Examiner.*